May 4, 1926.　　　　　　　　　　　　　　　　　1,583,732
J. NAGY
SAFETY DEVICE FOR VEHICLES
Filed Jan. 4, 1926　　　　　3 Sheets-Sheet 1

Joseph Nagy, INVENTOR

BY Victor J. Evans
ATTORNEY

WITNESS: John Donovan

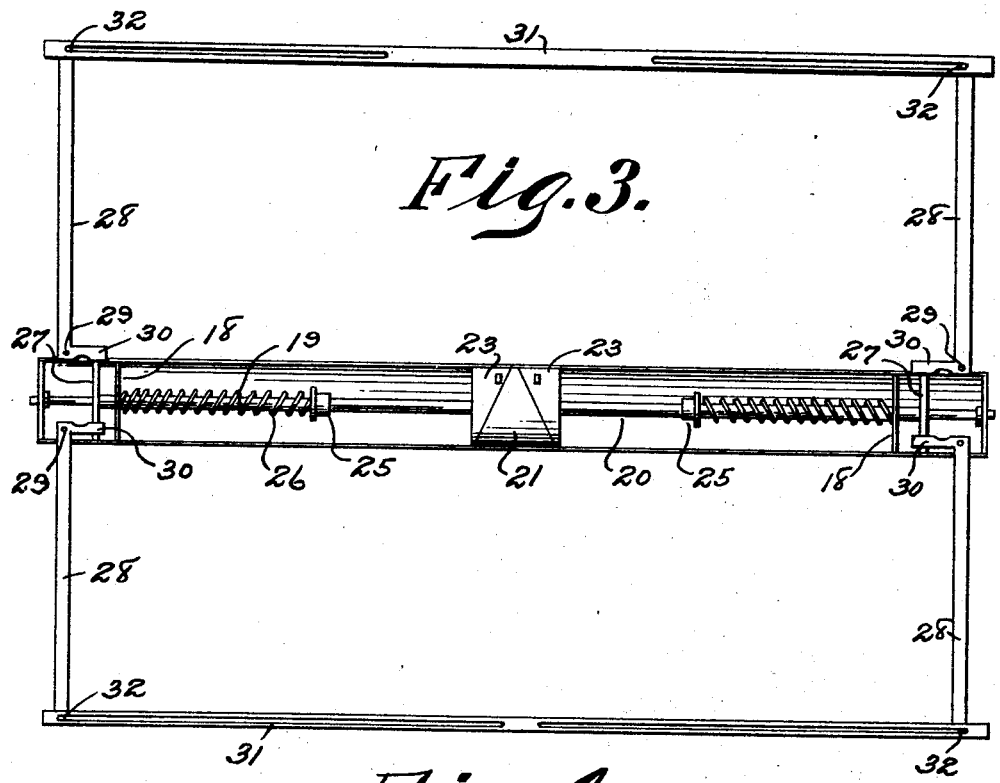
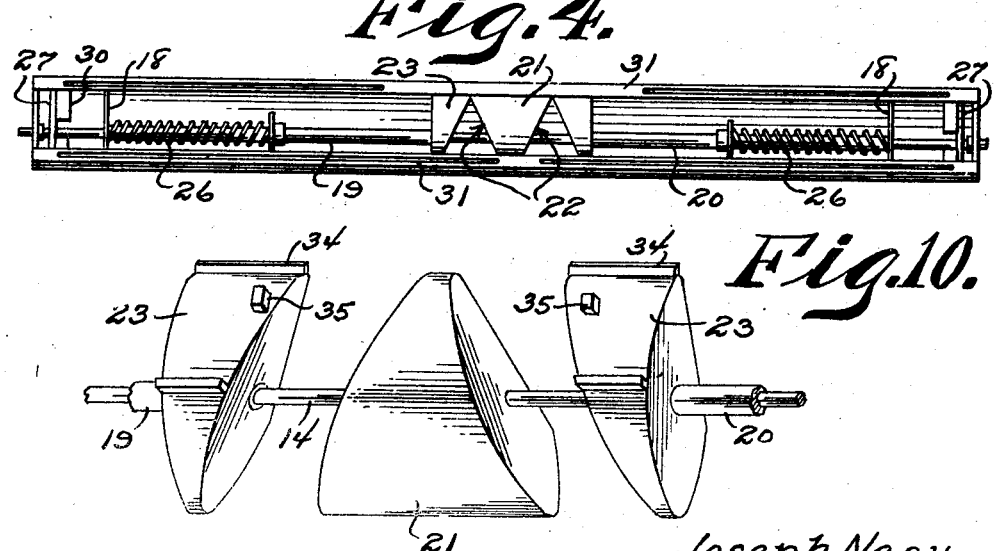

May 4, 1926.
J. NAGY
1,583,732
SAFETY DEVICE FOR VEHICLES
Filed Jan. 4, 1926
3 Sheets-Sheet 3
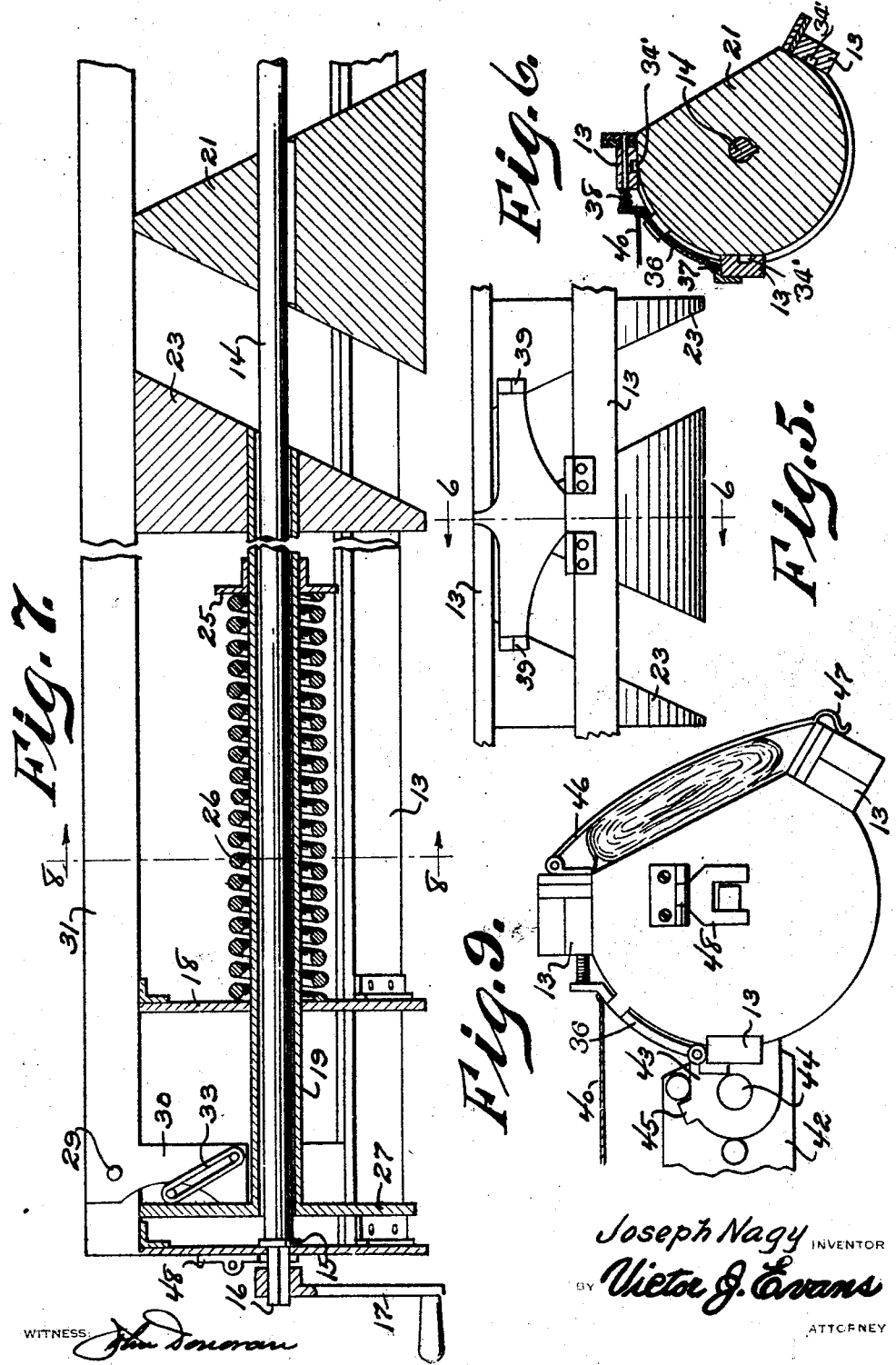
Joseph Nagy INVENTOR
BY Victor J. Evans
ATTORNEY Patented May 4, 1926.

1,583,732

UNITED STATES PATENT OFFICE.

JOSEPH NAGY, OF DETROIT, MICHIGAN.

SAFETY DEVICE FOR VEHICLES.

Application filed January 4, 1926. Serial No. 79,238.

*To all whom it may concern:*

Be it known that I, JOSEPH NAGY, a citizen of Hungary, residing at Detroit, in the county of Wayne and State of Michigan, have invented new and useful Improvements in Safety Devices for Vehicles, of which the following is a specification.

This invention relates to improvements in safety devices for vehicles and is especially adapted for use upon motor driven vehicles for preventing injury to pedestrians should the driver of the vehicle be unable to bring the same to a complete stop and the pedestrain be unable to escape the path of the approaching vehicle.

Another object resides in a safety appliance which has the appearance of an automobile bumper and which may be used as such under normal conditions, but which may be actuated by a suitable mechanism so as to cause a strip of canvas or other flexible material to be spread in front of the automobile for catching a person who might otherwise be run over and seriously injured.

A further object of the invention resides in a safety appliance for automobiles which is simple in construction, easy to set for instant operation, and which does not detract from the attractive appearance of an automobile.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 4 is a view similar to Figure 3 but showing the parts of the device when the same are set for operation.

Figure 5 is a detail rear elevation of the means for holding the parts in a set position.

Figure 6 is a vertical sectional view on the line 6—6 of Figure 5.

Figure 7 is an enlarged detail fragmentary vertical longitudinal sectional view.

Figure 8 is a vertical transverse sectional view on the line 8—8 of Figure 7.

Figure 9 is an enlarged elevation with the parts in a set position.

Figure 10 is a detail perspective view of the wedge member and co-acting parts.

Figure 1:
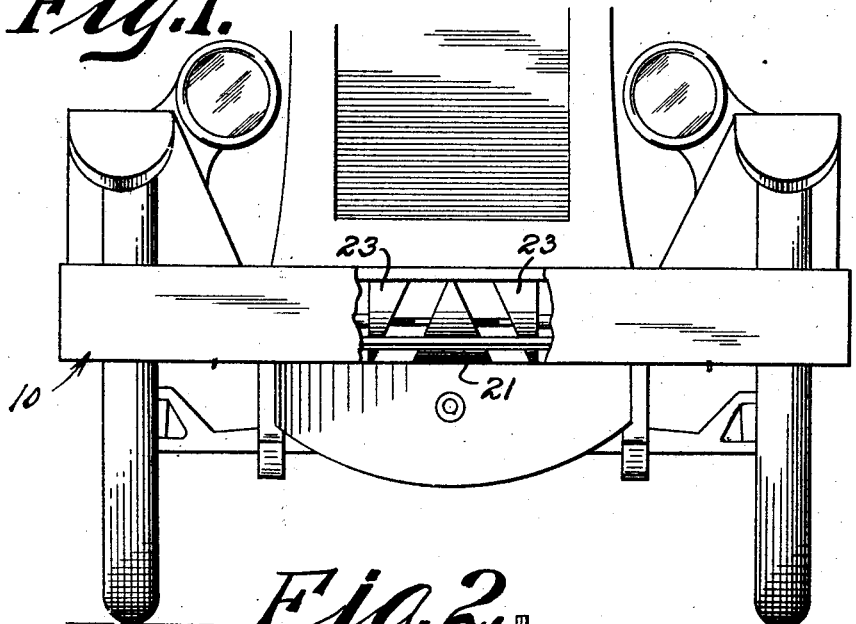
Figure 1 is a front elevation of an automobile showing my safety device mounted thereon and ready for use, with parts broken away.

Referring more particularly to the drawings, the reference numeral 10 designates my improved safety device and is shown in the drawings as mounted forward of an automobile and extending the width of the same, to prevent a person who might be struck from passing beneath the vehicle.

The device 10 comprises a pair of end plates 12 which are held in a fixed spaced relation by cross bars 13, there being three of such bars shown and which are believed sufficient to provide a rigid supporting structure for the working parts now to be described.

Figures 2, 3:
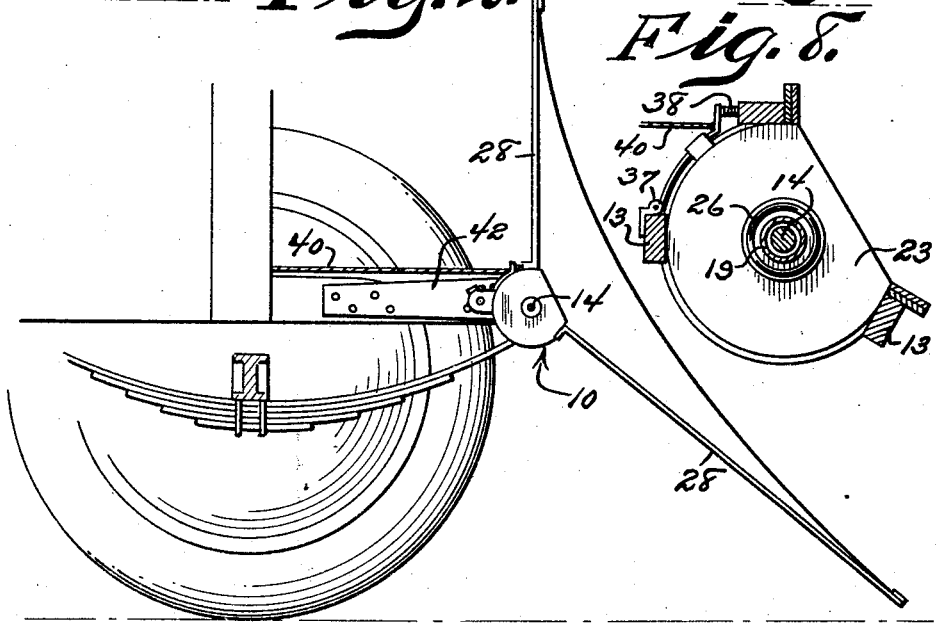
Figure 2 is a side elevation of an automobile with the safety device in an operative position.
Figure 3 is a front elevation of the device per se with the canvas removed therefrom and showing the same in an extended position.

Journalled for rotation in the end plates is a shaft 14, but which shaft is held against longitudinal movement by shoulders 15 provided thereon and engaging the inner faces of the plates. One end of the shaft 14 projects a slight distance beyond one of the plates and is squared as at 16 to receive a crank handle 17, whereby manual rotation may be imparted to the shaft to set the device for automatic operation. Supported by the bars 13 in spaced relation to the end plates, are intermediate plates 18 which serve as bearings for the tubular shafts 19 and 20, which latter shafts encircle the shaft 14 for a portion of its length. Fixed to the shaft 14 midway between its ends, is a wedge member 21 having inclined side walls 22 for co-action with heads 23 carried by the inner ends of the respective tubular shafts and which also have an inclined face 24 for co-action with the respective inclined faces on the wedge member. A collar 25 is fixedly mounted on each tubular shaft in spaced relation to the plates 18 and interposed between each respective collar and its adjacent plate 18 is an expansion spring 26, which tends to normally hold the co-acting faces of the heads 23 in engagement with the inclined faces of the wedge member 21. When the heads are in co-acting engagement with the edge member, the device is in an open or extended position such as shown in Figures 2 and 3 of the drawings.

The outer end of each tubular rod carries a disk 27 which is adapted to actuate a set of arms 28, which are pivotally mounted to the supporting structure as at 20. As there are two disks 27, there as also two sets of arms 28, one at each end of the device and the arms of each set extend at an angle with respect to each other when fully extended so as to spread the canvas. Each arm has a right angularly bent portion or leg 30 which is normally disposed in the path of the disks so as to hold the arms in an extended position, but which disks are adapted to be shifted by the wedge member 21 to clear the legs and allow the arms to swing inwardly about the pivots 29. The horizontally opposed arms 28 of the sets of arms are connected by rods 31, and to which rods are attached the ends of a strip of heavy flexible canvas adapted to be held taut across the front of an automobile when the arms are in an extended position, such as shown in Figure 2 of the drawings. Two opposed arms 28 and one connecting rod 31 constitute a frame section.

The arms 28 are loosely connected with the respective rods 31 by pin and slot connections 32 which allow the rods and arms to lie parallel with the shaft 14 when the same is folded to provide a compact structure, and which pin and slot connection limits the outward swinging movement of the arms. A link 33 is fixedly connected to each disk 27 and loosely connected with the adjacent leg 30 of each arm so as to exert a pull upon the arm when the disk is moved out of the path of the leg during the folding of the arms.

From the foregoing description, it will be seen that when it is desired to set the device for automatic operation, the crank handle 17 is applied to the square end of the shaft 14 and the said shaft given a one-half revolution which causes the wedge member 21 to co-act with the heads 23 and force them, together with the tubular shafts in opposite directions at which time the disks 27 move out of the path of the legs 30 and pull the respective arms to a closed position such as shown in Figure 4 of the drawings. The heads 23 are provided with longitudinal ribs 34 which slide in grooves 34' provided in the respective bars 13, so that the tubular shafts and the heads are held against rotation but are allowed longitudinal sliding movement. Having caused the arms 27 to fold inwardly against the action of the springs 26, it is now necessary to provide some means for holding them in this position and for releasing the same at the desired time. For this purpose, I provide a lug 35 on each head 23, and against which lugs a plate 36 rests and is pivotally supported by one of the rods 13 as at 37. A contractile spring 38 has one end connected with the plate to hold the same against the lugs and the other end connected with the adjacent cross rod. The plate 36 is provided with spaced notches 39 disposed in the path of the sliding movement of the lugs 35, and when the heads reach the limit of their sliding movement in the direction away from each other, the said lugs enter the respective notches and hold the device set against the action of the springs 26. After the lugs have engaged the notches, the shaft 14 is turned back to its normal position as shown in Figure 4 of the drawings to provide a space between the wedge member and the heads, at which time the parts are in a position for automatic operation.

Having described the manner of setting the device, I shall now explain the releasing means and the operation thereof. For this purpose, a flexible cable 40 has one end connected to the top of the plate 36 and is led over pulleys 41 to a point on the dash board or at any other convenient location within reach of the driver of the vehicle. When the device is set as hereinbefore described and an emergency arises, for the use of the device, a pull is imparted to the flexible cable against the action of the spring 38 to release the plate 36 from the lugs 35 which allows the heads 23 to move toward each other by reason of the tension of the springs 26. As the heads and tubular shafts are shifted the disks 27 also move inwardly and force the arms 28 outwardly to an extended or opened position which spreads the canvas 32.

For attaching the device to the vehicle, I provide arms 42 fixed to the chassis frame and to which the ears 43 of the device pivotally connect as at 44. The ears are each provided with a lug 45 which engages pins 46 for allowing a limited backward rocking to the device so that the same will yield when used as a bumper.

When the device has been set, the canvas 32 is neatly folded as shown in Figure 9 and is held by a pivoted cover member 46, which is provided with a spring clip 47 engaging one of the bars 13. The tension of the spring clip is such as to automatically release to permit the door to open as the arms 28 to swing outwardly.

For the purpose of locking the shaft 14 against rotation when the device is set, there is provided a U-shaped member 48 carried by one of the end plates 12 and co-acting with the squared end of the shaft. Before the crank is applied to the shaft for imparting rotation thereto, the member 48 is swung upwardly to a raised position.

From the foregoing description, it will be seen that I have provided a safety device adapted to be mounted at the front end of an automobile and which does not detract from the appearance of the car, as the device gives the appearance of an ordinary bumper when folded up for operation.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a safety device for automobiles, the combination of a rotatable shaft, a pair of collapsible frame sections, a strip of flexible material connecting said sections, means operable upon a partial rotation of said shaft for moving said frame sections to a collapsed position, means for holding said frame sections in a collapsed position upon operation of said first means and after said shaft has been rotated to return to normal position, and control means for actuating said last mentioned means.

2. In a safety device for automobiles, the combination of a rotatable shaft, a pair of collapsible frame sections, a strip of flexible material connecting said sections, means operable upon a partial rotation of said shaft for moving said frame sections to a collapsed position, said means including a wedge member fixed to said shaft, and slidable parts operable thereby, means for holding said frame sections in a collapsed position upon operation of said first means and after said shaft has been rotated to return to normal position, and control means for actuating said last mentioned means.

3. In a safety device for automobiles, the combination of a rotatable shaft, a wedge member fixedly mounted thereon, a slidable tubular shaft disposed on each side of said wedge member and encircling said rotatable shaft, a head provided on the inner end of each tubular shaft, tension means for normally holding the heads in engagement with said wedge member, a pair of frame sections, and co-acting means on the tubular shafts for holding said frame sections in an extended position.

4. In a safety device for automobiles, the combination of a rotatable shaft, a wedge member fixedly mounted thereon, a slidable tubular shaft disposed on each side of said wedge member and encircling said rotatable shaft, a head provided on the inner end of each tubular shaft, tension means for normally holding the heads in engagement with said wedge member, a pair of collapsible frame sections, co-acting means on the tubular shafts for holding said frame sections in an extended position, and a handle for attachment to one end of said rotatable shaft for manually imparting a partial rotation to the same to cause said wedge member to co-act with the heads on the tubular shafts and to slide the same in opposite directions against the action of said tension means to release said co-acting means to cause said frame sections to move to a collapsed position.

5. In a safety device for automobiles, the combination of a rotatable shaft, a wedge member fixedly mounted thereon, a slidable tubular shaft disposed on each side of said wedge member and encircling said rotatable shaft, a head provided on the inner end of each tubular shaft, tension means for normally holding the heads in engagement with said wedge member, a pair of collapsible frame sections, co-acting means on the tubular shafts for holding said frame sections in an extended position, and a handle for attachment to one end of said rotatable shaft for manually imparting a partial rotation to the same to cause said wedge member to co-act with the heads on the tubular shafts and to slide the same in opposite directions against the action of said tension means to release said co-acting means to cause said frame sections to move to a collapsed position, and means for locking the heads and tubular shafts at the limit of their sliding movement to hold the same and allow said wedge member to be returned to its former position upon the reverse manual rotation of said rotatable shaft.

6. In a safety device for automobiles, the combination of a rotatable shaft, a wedge member fixedly mounted thereon, a slidable tubular shaft disposed on each side of said wedge member and encircling said rotatable shaft, a head provided on the inner end of each tubular shaft, tension means for normally holding the heads in engagement with said wedge member, a pair of collapsible frame sections, co-acting means on the tubular shafts for holding said frame sections in an extended position, and a handle for attachment to one end of said rotatable shaft for manually imparting a partial rotation to the same to cause said wedge member to co-act with the heads on the tubular shafts and to slide the same in opposite directions against the action of said tension means to release said co-acting means to cause said frame sections to move to a collapsed position, means for locking the heads and tubular shafts at the limit of their sliding movement to hold the same and allow said wedge member to be returned to its former position upon the reverse manual rotation of said rotatable shaft, and control means for actuating said last mentioned means to allow said tension means to return said tubular shafts and heads to return to their former position and said frame sections to automatically be extended.

In testimony whereof I have affixed my signature.

JOSEPH NAGY.